(12) United States Patent
Lorenzen

(10) Patent No.: US 11,005,579 B1
(45) Date of Patent: May 11, 2021

(54) METHOD AND TEST SYSTEM FOR PERFORMING A RUN-TIME MEASUREMENT

(71) Applicant: Rohde & Schwarz GmbH & Co. KG, Munich (DE)

(72) Inventor: Rolf Lorenzen, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/861,531

(22) Filed: Apr. 29, 2020

(51) Int. Cl.
H04B 17/11 (2015.01)
H04B 17/00 (2015.01)
H04B 17/21 (2015.01)

(52) U.S. Cl.
CPC ......... H04B 17/11 (2015.01); H04B 17/0085 (2013.01); H04B 17/21 (2015.01)

(58) Field of Classification Search
CPC .... H04B 17/0085; H04B 17/11; H04B 17/12; H04B 17/14; H04B 17/21; H04B 17/391; H04B 17/3912
See application file for complete search history.

(56) References Cited

U.S. PATENT DOCUMENTS

| 9,651,655 | B2* | 5/2017 | Feldman | ................. G01S 19/51 |
| 2006/0227315 | A1* | 10/2006 | Beller | ..................... G01S 17/26 356/3 |
| 2015/0350936 | A1* | 12/2015 | Qi | ......................... H04W 24/02 370/252 |

* cited by examiner

*Primary Examiner* — Siu M Lee
(74) *Attorney, Agent, or Firm* — Christensen O'Connor Johnson Kindness PLLC

(57) ABSTRACT

A test system and method of performing a run-time measurement for calibration of a device used for time-of-flight measurement are disclosed. The method comprises: providing a measurement device, a device under test and a directive component having three ports; connecting the directive component to a transmission port of the measurement device and a reception port of the measurement device; generating a signal by a signal generator; forwarding the signal to the directive component; receiving at least a response by a signal receiver; and determining a loop time indicative of the run-time between the directive component and the device under test as well as a time of internal processing of the device under test, wherein the loop time is independent of a signal processing time of a signal path between the measurement device and the directive component.

17 Claims, 3 Drawing Sheets

METHOD AND TEST SYSTEM FOR PERFORMING A RUN-TIME MEASUREMENT

FIELD OF THE DISCLOSURE

Embodiments of the present disclosure generally relate to a method of performing a run-time measurement for calibration of a device used for time-of-flight (ToF) measurement. Further, embodiments of the present disclosure generally relate to a task system for performing a run-time measurement to calibrate a device used for time-of-flight (ToF) measurement.

BACKGROUND

Ultra wide band (UWB) devices are known in the state of the art that are used for so-called ranging by time-of-flight measurements. The respective time-of-flight measurement is performed by means of two or more devices wherein the respective distance is measured by means of a message ping-pong between the respective devices while calculating the time, the packets needed to travel over the air.

The simplest method is called single sided two way ranging (SS-TWR). However, this method is inaccurate due to an allowed clock error up to 20 ppm. Therefore, the so-called double sided two way ranging (DS-TWR) is typically used in practice.

For this method however, it is necessary to calibrate the respective devices used for the time-of-flight measurement appropriately. Particularly, an error of a participating ultra wide band device shall correspond to approximately some 10 ps, ensuring the required clock error in the entire measurement system for time-of-flight measurement. In this regard, it is to be noted that 100 ps correspond to a distance of 3 cm.

The techniques known so far for calibrating the devices used for time-of-flight measurements are quite complex and, therefore, time consuming and expensive.

Accordingly, there is need for a simple and cost-efficient manner to calibrate a device used for time-of-flight measurement.

SUMMARY

The present disclosure provides a method of performing a run-time measurement for calibration of a device used for time-of-flight measurement. In an embodiment, the method comprises the steps of:

providing a measurement device, a device under test and a directive component having three ports;

connecting the directive component to a transmission port of the measurement device and a reception port of the measurement device;

generating a signal by a signal generator;

forwarding the signal to the directive component;

receiving at least a response by a signal receiver; and determining a loop time indicative of the run-time between the directive component and the device under test as well as a time of internal processing of the device under test, wherein the loop time is independent of a signal processing time of the signal path between the measurement device and the directive component.

Further, the present disclosure provides a test system for performing a run-time measurement to calibrate a device used for time-of-flight measurement. In an embodiment, the test system comprises a measurement device, a device under test as well as a directive component with three ports. The directive component is connected to a transmission port of the measurement device and a reception port of the measurement device. The test system comprises a signal generator for generating a signal that is forwarded to the directive component. The test system comprises a signal receiver for receiving at least a response. The test system further comprises an analysis circuit or module for determining a loop time indicative of the run-time between the directive component and the device under test as well as the time of internal processing of the device under test, wherein the loop time is independent of a signal processing time of the signal path between the measurement device and the directive component.

The test system as well as the method can be used for calibrating a device that is used for time-of-flight measurement, namely the device under test, in an accurate manner such that an error associated with the respective device is reduced to about some 10 ps.

The respective measurement performed by the test system ensures that the exact loop time can be determined since everything associated with the measurement device, for example the signal path between the measurement device and the directive component, has no impact on the accuracy when determining the loop time. Uncertainties associated with the measurement device do not influence the determination of the loop time that is used for calibrating the device under test appropriately. In other words, the time associated with the device under test can be determined more accurately, resulting in a more accurate calibration of the device under test.

Once the device under test has been calibrated in an accurate manner, the respective device can be used for a real time-of-flight measurement which requires a real time protocol with respective messages and meaningful data content.

A real time-of-flight measurement can also be performed by the test system for determining the loop time. However, a real time-of-flight measurement is not necessary for the respective determination of the loop time such that simply constructed measurement devices can be used that are not able to process a real time protocol.

For instance, the measurement device is a radio communication tester. Typically, such a radio communication tester has a lot of flexibility in radio frequency (RF) path routing, step attenuator, field-programmable gate array (FPGA) and/or first-in first-out (FIFO).

The device under test may be a mobile phone.

An aspect provides that the measurement device also receives a reverse signal from the directive component. The reverse signal is used for compensating any influence of the measurement device itself or rather the signal path between the measurement device and the directive component, thereby ensuring that the loop time determined is accurate since an error introduced by the measurement device can be excluded, for example of a front end of the measurement device.

As described above, the measurement device, for example its front end, comprises several components that might have an influence on the signal processing and, therefore, on the entire time required for signal processing. This impact is excluded appropriately.

In some embodiments, the reverse signal is a signal split from a signal issued by the measurement device, wherein the reverse signal is split by the directive component that processes the signal issued by the measurement device. The signal issued by the measurement device may relate to the signal generated by the signal generator provided that the measurement comprises the signal generator. Alternatively, the signal issued by the measurement device may correspond to the response to be received by the signal receiver. Hence, the measurement device receives the signal generated by the signal generator while processing the signal generated in order to issue the response. The response is forwarded to the device under test via the directive component which split of the reverse signal that is forwarded to the measurement device, for example another signal receiver integrated within the measurement device.

Generally, the test system ensures that the measurement can be initiated by the measurement device itself or rather the device under test.

Depending on the respective measurement mode, the measurement device forwards the signal to the device under test in order to receive a response from the device under test or rather the measurement device provides the response that is forwarded to the device under test.

Another aspect provides that the loop time determination is triggered by the signal generator when generating the signal or by the signal receiver. For instance, the measurement of the loop time is started when the signal generator generates the signal that is forwarded to the directive component. Alternatively, the loop time measurement is started when the signal receiver receives a signal. The respective signal received by the signal receiver may correspond to the reverse signal that however is derived from the signal generated by the signal generator or the response.

In some embodiments, the measurement is triggered on a marker provided by the signal generator or on a power of a received signal, namely the reverse signal. Both triggers only concern the beginning of a respective capture sequence for determining the loop time. However, these different triggers do not have an impact on the accuracy of the determination of the loop time that is used for the calibration of the device under test. Put differently, the respective trigger applied has no impact on the accuracy of the time-of-flight calibration value that is used for calibrating the device under test.

In general, the respective measurement can capture the signal generated as well as the response in one single capture, which allows to calculate the exact loop time in an efficient manner, for example in a post-processing of the measurement, also called measurement post-processing.

Accordingly, the directive component may be connected to a front end of the measurement device such that any influence of internal signal processing components of the measurement device is irrelevant on the determination of the loop time. As discussed above, the internal signals process components of the measurement device do not have an impact on the timing accuracy used for determining the loop time.

In addition, an internal time delay introduced by the directive component may be taken into consideration when determining the loop time. The directive component has an impact on the run-time between the directive component and the device under test, also called time-of-flight, which is part of the loop time.

In order to reduce any time delay introduced by the directive component, the directive component is established as small as possible. Hence, a ranging impact is small even if the internal time delay of the directive component is not taken into account.

However, any remaining internal time delay introduced by the directive component can be calculated and, therefore, taken into account. The directive component has three ports as mentioned above such that three signal paths are provided, yielding three different group delays that are considered in order to determine a mean group delay of the directive component. In some embodiments, the mean group delay of the directive component can be described as follows:

$$T_{gs} = \frac{(T_{g1s} + T_{g2s} - T_{g21})}{2},$$

wherein $T_{gXY}$ relate to the respective group delays of the signal paths associated with the ports "1" and "2" assigned to the ports of the measurement device and port "S" associated with the device under test.

In addition, a time delay introduced by a cable connecting the directive component and the device under test may be taken into consideration. This time delay is also called attenuator delay which can be measured by a network analyzer.

According to an embodiment, the directive component is connected via its third port with a cable that is connected with the device under test. Hence, a wired connection is established wherein any attenuation introduced by the cable may be considered appropriately for improving the accuracy. In any case, the length of the cable between the device under test and the directive component shall be as short as possible in order to reduce any impact of the cable connection on the measurement accuracy.

In an alternative embodiment, the directive component is connected via its third port with an antenna. Thus, the connection of the directive component with the device under test can be established by an over-the-air (OTA) connection such that the respective measurement of the loop time is also performed over-the-air.

For instance, the directive component is established as a coupler, a splitter, a divider or a combiner. In any case, the respective component used has directive characteristics such that a reverse signal can be derived from the signal issued by the measurement device which is needed in order to determine the loop time accurately.

The measurement device may comprise the signal generator and the signal receiver, wherein the device under test generates the response. In this operation mode, the measurement device initiates the respective measurement of the loop time since the measurement device generates the signal that is forwarded to the device under test via the directive component. The directive component splits the reverse signal from the signal generated by the signal generator, wherein the reverse signal is received by the signal receiver integrated within the measurement device. Further, the device under test receives and processes the signal generated, wherein the device under test is configured to generate a response that is forwarded to the measurement device via the directive component as well. In this embodiment, the loop time measurement may be triggered by the signal generator, for example its marker signal, or rather the signal receiver integrated in the measurement device.

Alternatively, the device under test imitates the measurement by transmitting an initiation signal to measurement device for starting the respective measurement. The measurement device receives and processes the initiation signal while generating the signal to be forwarded to the device under test as described above. However, this alternative embodiment distinguishes from the one described earlier in that the device under test initiates the measurement by issuing the initiation signal at the beginning that is processed by the measurement device appropriately.

Moreover, the device under test may comprise the signal generator and the signal receiver, wherein the measurement device generates the response that is forwarded to the device under test. Hence, the respective measurement may also be initiated by the device under test that is configured to generate the signal which is forwarded to the measurement device via the directive component. The measurement device receives the signal generated which is processed internally in an appropriate manner. The measurement device is further configured to generate the response that is forwarded to the device under test via the directive component, wherein the response is received by the signal receiver associated with the device under test. Hence, the reverse signal is derived from the response signal that is issued by the measurement device.

Generally, the device under test and/or the measurement device may each comprise a signal generator and a signal receiver.

The analysis circuit or module of the test system may be integrated within the measurement device or the device under test.

However, the analysis module may also be established in a separate manner with respect to the device under test and the measurement device. In this case, the analysis module has connection with at least one of the measurement device and the device under test such that it receives the respective timing information. Depending on the timing information received, the analysis module is enabled to determine the time loop in an appropriate manner.

In general, the loop time can be calculated in a post-processing of the measurement, also called a measurement post-processing. However, the loop time may also be determined live.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
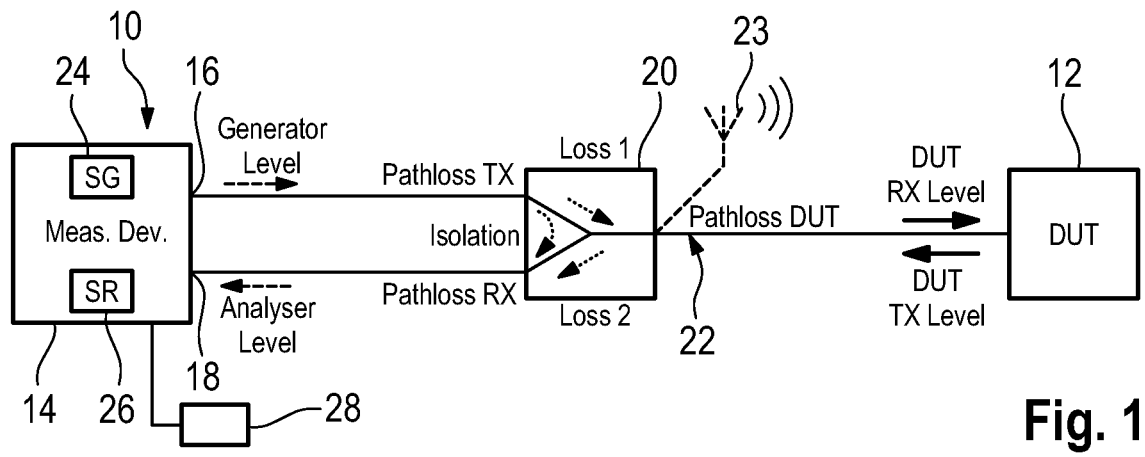
FIG. 1 shows a schematic overview of a representative test system according to an embodiment of the present disclosure.

FIG. 1 shows a test system 10 for performing a run-time measurement to calibrate a device used for time-of-flight measurement, which is represented by a device under test 12 ("DUT"). The test system 10 also comprises a measurement device 14 ("Meas. Dev.") that has a transmission port 16 as well as a reception port 18.

The measurement device 14 is connected with a directive component 20 that is established by a coupler, for instance. The directive component 20 has three ports in total via which the directive component 20 is connected with the transmission port 16, the reception port 18 as well as the device under test 12.

In the shown embodiment, the device under test 12 and the directive component 20 are interconnected with each other by a cable 22. However, the directive component 20 may also be connected with an antenna 23 via its third port as indicated by the dashed lines in FIG. 1.

The test system 10 further comprises a signal generator 24 ("SG") as well as a signal receiver 26 ("SR") that are associated with the measurement device 14 in the shown embodiment.

Accordingly, the measurement device 14 is enabled to generate a signal that is forwarded to the directive component 20 for being forwarded to the device under test 12. This is illustrated by the respective arrow labelled with "Generator Level". The directive component 20 is enabled to split a reverse signal from the signal generated that is forwarded to the signal receiver 26 of the measurement device 14. This is illustrated by the respective arrow labelled with "Analyzer Level".

In addition, the signal generated is forwarded to the device under test 12 via the directive component 20 by means of the cable 22 such that the device under test 12 receives the signal generated. This is illustrated by the respective arrow labelled with "DUT RX Level". The device under test 12 processes the signal generated and generates a response that is forwarded to the measurement device 14 via the directive component 20. This is illustrated by the respective arrow labelled with "DUT TX Level". The response of the device under test 12 is received by the signal receiver 26 of the measurement device 14 as well.

In addition, an analysis circuit or module 28 is provided that is connected with the measurement device 14. Alternatively, the analysis module 28 may be integrated within the measurement device 14.

Figure 2:
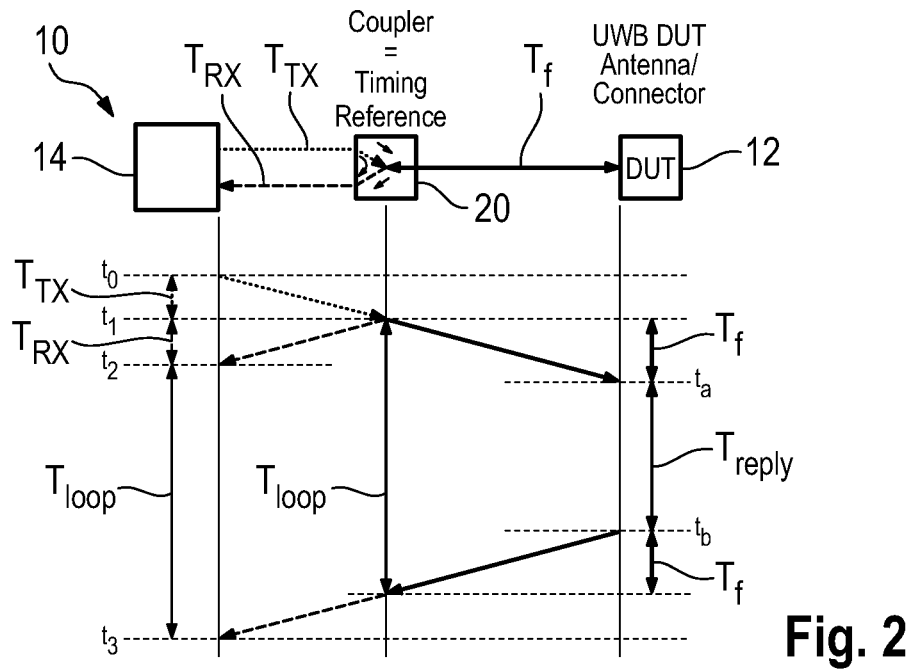
FIG. 2 shows a schematic overview illustrating the timing when performing a run-time measurement for calibration of the device used for time-off-flight measurement according to an example of the present disclosure.
Figure 3:
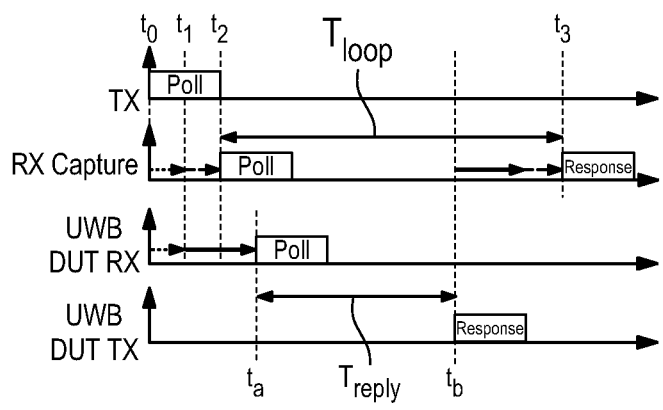
FIG. 3 shows another overview of the timing illustrated in FIG. 2.

FIGS. 2 and 3 each show a schematic overview in form of a timetable that illustrate the different times of the respective signals. From these FIGURES, it becomes apparent that the test system 10, for example the analysis module 28, is enabled to determine a loop time that is indicative of the runtime between the directive component 20 and the device under test 12 as well as the time of internal processing of the device under test 12.

In some embodiments, the loop time is independent of a signal processing time of a signal path between the measurement device 14 and the directive component 20 since the directive component 20 is connected to a front end of the measurement device 14 such that any influence of internal signal processing components of the measurement device 14 is irrelevant on the determination of the loop time, for example the length of the connections between the directive component 20 and the measurement device 14.

These internal signal processing components may correspond to analogue-to-digital converters, digital-to-analogue converters, or any other signal processing components.

As shown in FIGS. 2 and 3, the measurement device 14 generates the signal by the signal generator 24 at a time to. The signal is forwarded to the directive component 20 via the internal signal processing components of the measurement device 14 associated with the front end. At the time $t_1$ or rather after the duration $T_{TX}$, the signal generated is received by the directive component 20 that forwards the signal to the device under test 12 and splits a signal that is forwarded back to the measurement device 12 as the reverse signal which is indicated by the duration $T_{RX}$.

The internal signal receiver 26 of the measurement device 12 receives the reverse signal at $t_2$.

The device under test 12 however receives the signal generated after the time $t_a$ that comprises the durations $T_{TX}$ and $T_f$ indicative of the run-time between the directive component 20 and the device under test 12 which might be influenced by the cable 22.

The device under test 12 processes the signal received internally and responses with a response at the time $t_b$.

The response is forwarded to the measurement device 14 via the cable 22 and the directive component 20, which in total lasts the durations $T_f$ and $T_{RX}$ such that the signal receiver 26 receives the response at the time $t_3$.

The loop time to be determined is labelled by $T_{loop}$.

As shown in FIGS. 1 and 2, the loop time $T_{loop}$ comprises the time of internal processing of the device under test 12 which is indicated by $T_{reply}$ as well as the run-time between the directive component 20 and the device under test 12 which is indicated by $T_f$.

The loop time can be determined from the respective timings measured as follows:

$$t_2 = T_{TX} + T_{RX}$$

$$t_3 = T_{TX} + T_f + T_{reply} + T_f + T_{RX}$$

$$T_{loop} = t_3 - t_2 = 2 \cdot T_f + T_{reply}$$

In general, the measurement may be triggered by the signal receiver 26 when receiving a signal, namely the reverse signal from the directive component 20. Hence, the measurement is started at the time $t_2$ as indicated in FIG. 3.

Alternatively, the determination of the loop time can be triggered by the signal generator 24 itself that outputs a marker in order to start the time measurement for determining the loop time $T_{loop}$. Then, the times $t_2$ and $t_3$ are measured, wherein the loop time $T_{loop}$ is determined by subtracting $t_2$ from $t_3$ as indicated before.

In addition, internal time delays introduced by the directive component 20 may also be taken into consideration when determining the loop time $T_{loop}$.

In general, the size of the respective directive component is low such that any impact on the timing is also low. However, any remaining influence may be determined appropriately by taking the respective group delay of internal signal paths into account. Thus, the accuracy of the determined loop time $T_{loop}$ can be improved appropriately. In some embodiments, a mean group delay of the directive component 20 is determined as follows:

$$T_{gs} = \frac{(T_{g1s} + T_{g2s} - T_{g21})}{2},$$

wherein $T_{gXY}$ relate to the respective group delays of the signal paths associated with the ports "1" and "2" assigned to the ports of the measurement device and port "S" associated with the device under test.

In addition, the attenuation of the cable 22 may also be considered which is determined previously by means of a network analyzer.

As mentioned above, the respective measurement is initiated by the measurement device 14 that generates the signal that is forwarded to the device under test 12.

However, the respective measurement can also be initiated by the device under test 12 that transmits an initiation signal at the beginning that is processed by the measurement device 14 in order to start the measurement described above.

Figure 4:
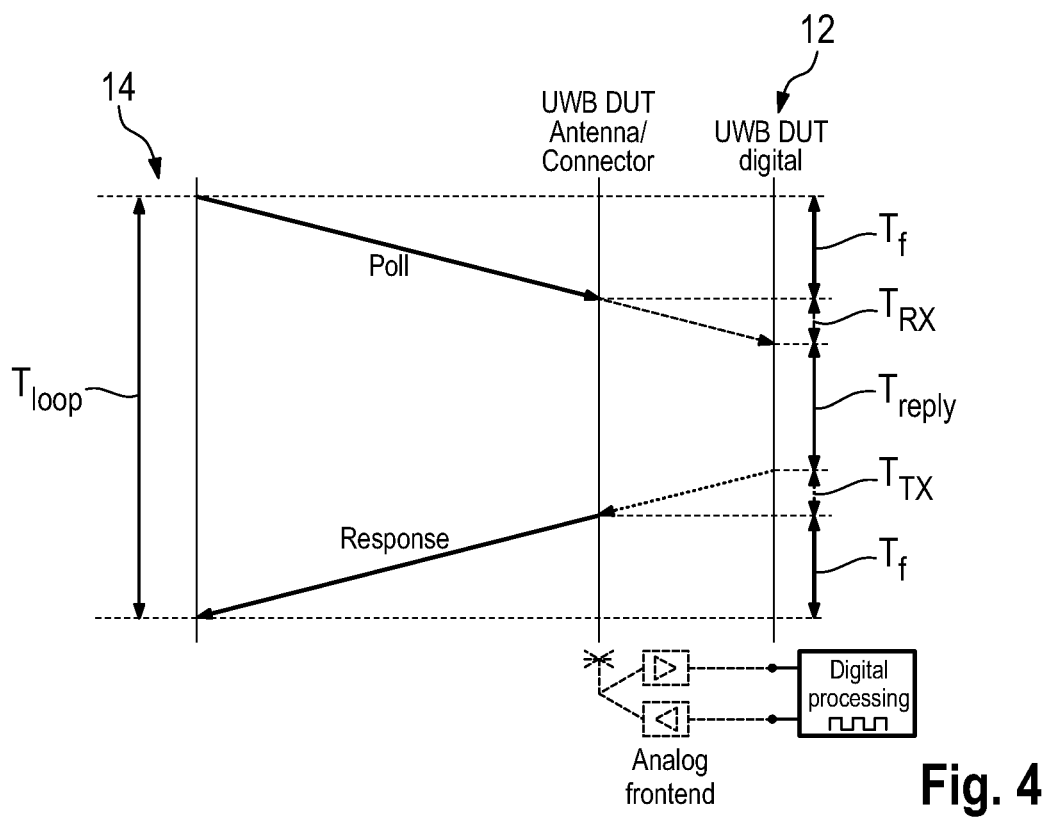
FIG. 4 shows a UWB anchor calibration of an analog front end of a device used for time-of-flight measurement.
Figure 5:
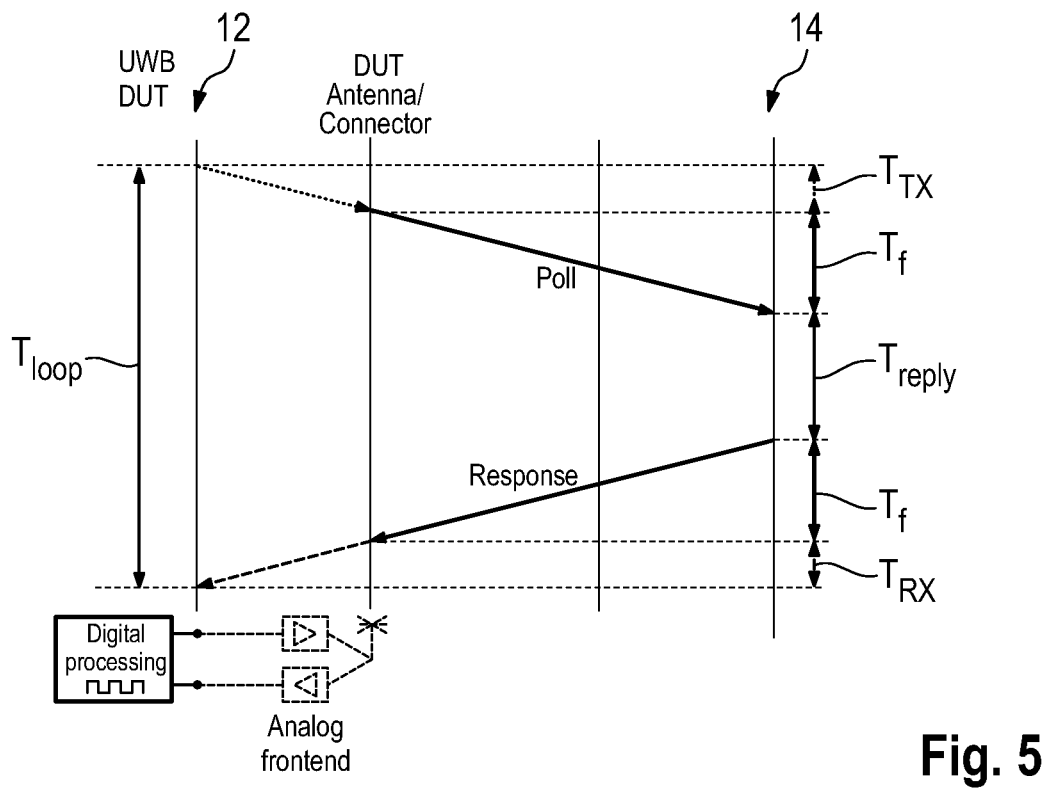
FIG. 5 shows a UWB tag calibration of an analog front end of a device used for time-of-flight measurement.

In general, this procedure ensures that the device under test 12 can be calibrated more accurately. The portions of the device under test 12 associated with its analog front end have to be calibrated that are labelled with $T_{RX?}$ and $T_{TX?}$. In FIGS. 4 and 5 for a so-called UWB anchor calibration and a so-called UWB tag calibration respectively. The device under test 12, namely the mobile phone, may be used as anchor or tag.

In some embodiments, the internal delays introduced by the analog front end of the device under test 12 are to be determined for calibrating purposes.

Figure 6:
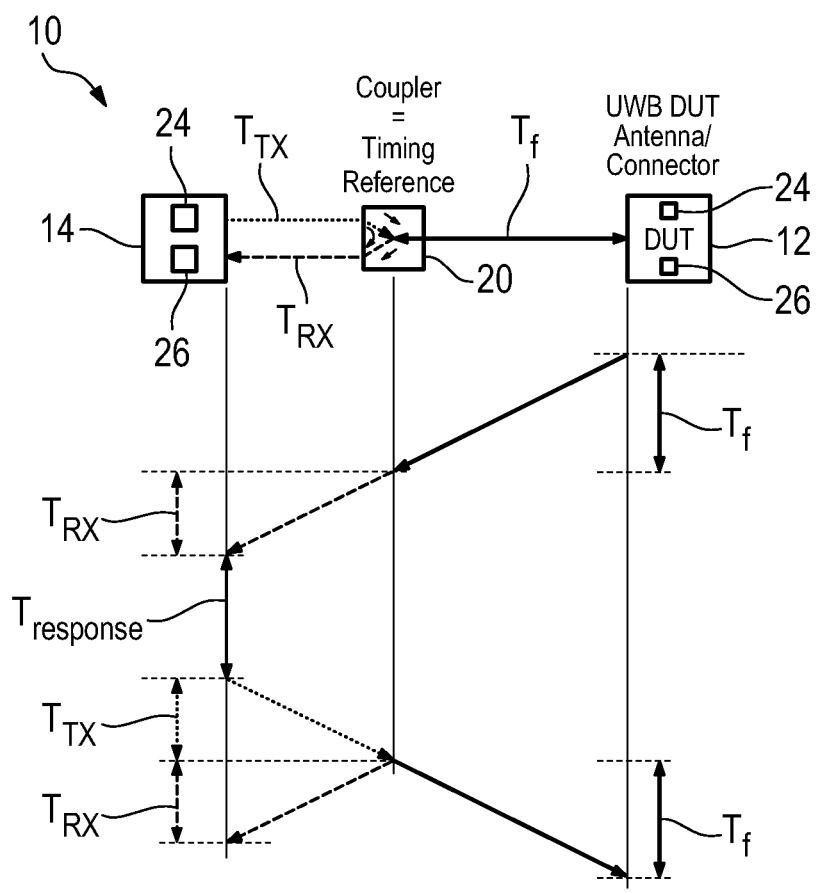
FIG. 6 shows a schematic overview illustrating the timing when performing a run-time measurement for calibration of the device used for time-off-flight measurement according to another example of the present disclosure.

In FIG. 6, another embodiment is shown in which the device under test 12 generates a signal that is forwarded towards the measurement device 14 via the directive component 20. The measurement device 14 receives and processes the signal generated while issuing a response that is forwarded to the device under test 12 via the directive component 20 that splits the reverse signal from the response issued by the measurement device 14 which is forwarded to the measurement device 14.

Again, the influence of any component associated with the signal paths between the measurement device 14 and the directive component 20 can be compensated appropriately such that the loop time $T_{loop}$ can be determined in an accurate manner that is indicative of the run-time between the directive component 20 and the device under test 12 which in turn ensures an accurate calibration of the device under test 12.

Furthermore, the method and test system 10 ensure that additional parameters of the device under test 12 can be gathered simultaneously which improve the ranging by a single sided two way ranging (SS-TWR) while using the device under test 12. In some embodiments, the calibrated device under test 12 can be used for both single sided two way ranging (SS-TWR) as well as double sided two way ranging (DS-TWR).

In general, the directive component 20 ensures that a timing reference is introduced into the test system 10 such that any influences on a side opposite to the device under test 12 with regard to the directive component 20 can be excluded appropriately, resulting in a more accurate determination of the respective timings, which in turn provides a more accurate calibration of the device under test 12.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method of performing a run-time measurement for calibration of a device used for time-of-flight measurement, the method comprising:
   providing a measurement device, a device under test and a directive component having three ports;
   connecting the directive component to a transmission port of the measurement device and a reception port of the measurement device;
   generating a signal by a signal generator;
   forwarding the signal to the directive component;
   receiving at least a response by a signal receiver; and
   determining a loop time indicative of the run-time between the directive component and the device under test as well as a time of internal processing of the device under test, wherein the loop time is independent of a signal processing time of a signal path between the measurement device and the directive component.

2. The method according to claim 1, wherein the measurement device also receives a reverse signal from the directive component.

3. The method according to claim 2, wherein the reverse signal is a signal split from a signal issued by the measurement device, wherein the reverse signal is split by the directive component processing the signal issued by the measurement device.

4. The method according to claim 1, wherein the loop time determination is triggered by the signal generator when generating the signal or by the signal receiver.

5. The method according to claim 1, wherein the directive component is connected to a front end of the measurement device such that any influence of internal signal processing components of the measurement device is irrelevant on the determination of the loop time.

6. The method according to claim 1, wherein an internal time delay introduced by the directive component is taken into consideration when determining the loop time.

7. The method according to claim 1, wherein the directive component is connected via its third port with a cable that is connected with the device under test.

8. The method according to claim 1, wherein the directive component is connected via its third port with an antenna.

9. The method according to claim 1, wherein the directive component is established as a coupler, a splitter, a divider or a combiner.

10. The method according to claim 1, wherein the measurement device comprises the signal generator and the signal receiver and wherein the device under test generates the response.

11. The method according to claim 1, wherein the device under test comprises the signal generator and the signal receiver and wherein the measurement device generates the response.

12. A test system for performing a run-time measurement to calibrate a device used for time-of-flight measurement, the test system comprising a measurement device, a device under test as well as a directive component with three ports, the directive component is connected to a transmission port of the measurement device and a reception port of the measurement device, the test system comprising a signal generator for generating a signal that is forwarded to the directive component, the test system comprising a signal receiver for receiving at least a response, the test system further comprising an analysis circuit for determining a loop time indicative of the run-time between the directive component and the device under test as well as a time of internal processing of the device under test, wherein the loop time is independent of a signal processing time of a signal path between the measurement device and the directive component.

13. The test system according to claim 12, wherein the measurement device comprises the signal generator and the signal receiver and wherein the device under test generates the response.

14. The test system according to claim 12, wherein the device under test comprises the signal generator and the signal receiver and wherein the measurement device generates the response.

15. The test system according to claim 12, wherein the directive component is established as a coupler, a splitter, a divider or a combiner.

16. The test system according to claim 12, wherein the directive component is connected via its third port with an antenna.

17. The test system according to claim 12, wherein the directive component is connected via its third port with a cable that is connected with a second device.

\* \* \* \* \*